(12) United States Patent
Sander et al.

(10) Patent No.: US 12,134,186 B2
(45) Date of Patent: Nov. 5, 2024

(54) 6-AXIS POSITIONING SYSTEM WITH LOCKING COMPONENT

(71) Applicant: PHYSIK INSTRUMENTE (PI) GMBH & CO. KG, Karlsruhe (DE)

(72) Inventors: Christian Sander, Karlsruhe (DE); Christian Rudolf, Karlsbad (DE)

(73) Assignee: PHYSIK INSTRUMENTE (PI) GMBH & CO. KG (DE)

( * ) Notice: Subject to any disclaimer, the term of this patent is extended or adjusted under 35 U.S.C. 154(b) by 0 days.

(21) Appl. No.: 17/909,795

(22) PCT Filed: Mar. 11, 2021

(86) PCT No.: PCT/EP2021/056197
§ 371 (c)(1),
(2) Date: Sep. 7, 2022

(87) PCT Pub. No.: WO2021/180853
PCT Pub. Date: Sep. 16, 2021

(65) Prior Publication Data
US 2024/0238992 A1    Jul. 18, 2024

(30) Foreign Application Priority Data

Mar. 12, 2020 (DE) ...................... 10 2020 106 741.0

(51) Int. Cl.
*B25J 17/02* (2006.01)
(52) U.S. Cl.
CPC .................. *B25J 17/0283* (2013.01)
(58) Field of Classification Search
CPC . B25J 17/0283; B25J 17/0216; B25J 17/0208
See application file for complete search history.

(56) References Cited

U.S. PATENT DOCUMENTS

| 4,664,232 A | * | 5/1987 | Takagi | .................... F16D 49/00 188/74 |
| 5,987,726 A | | 11/1999 | Akeel | |

(Continued)

FOREIGN PATENT DOCUMENTS

| CN | 107538231 A | 1/2018 |
| DE | 10255950 A1 | 6/2004 |

(Continued)

OTHER PUBLICATIONS

International Search Report (English and Deutsch) issued in PCT/EP2021/056197, mailed Jul. 12, 2021; ISA/EP (6 pages).

(Continued)

*Primary Examiner* — Gregory Robert Weber
(74) *Attorney, Agent, or Firm* — Harness, Dickey & Pierce, P.L.C.

(57) ABSTRACT

A 6-axis positioning system, comprising a base, a movable unit and six variable-length actuators, one end of each actuator being connected to the base and the other end of each actuator being connected to the movable unit. At least one additional variable-length component is provided, one end of which is connected to the base and the other end of which is connected to the movable unit. The 6-axis positioning system can be releasably locked at least in certain positions of the movable unit by means of this additional component. The additional component has a releasable locking brake, and the variable-length component is designed such that its length can be varied passively by means of the movement of the six driven actuators.

9 Claims, 1 Drawing Sheet

(56) References Cited

U.S. PATENT DOCUMENTS

| | | | |
|---|---|---|---|
| 6,330,837 B1 * | 12/2001 | Charles | ............... B25J 17/0266 |
| | | | 901/29 |
| 10,080,697 B2 * | 9/2018 | Swift | ..................... B25J 9/0006 |
| 2005/0067236 A1 * | 3/2005 | Conti | ..................... F16D 65/18 |
| | | | 188/73.1 |
| 2008/0294285 A1 | 11/2008 | Shoham | |
| 2016/0016309 A1 | 1/2016 | Swift et al. | |
| 2023/0064477 A1 * | 3/2023 | Sander | ................. B25J 17/0216 |

FOREIGN PATENT DOCUMENTS

| | | |
|---|---|---|
| DE | 102004004313 A1 | 8/2005 |
| DE | 102006011823 A1 | 9/2007 |
| EP | 0834383 A1 | 4/1998 |

OTHER PUBLICATIONS

Notice of Reasons for Refusal issued in corresponding Japanese Patent Application No. 2022-554628 dated Nov. 22, 2023, with English translation (16 Pages).

* cited by examiner

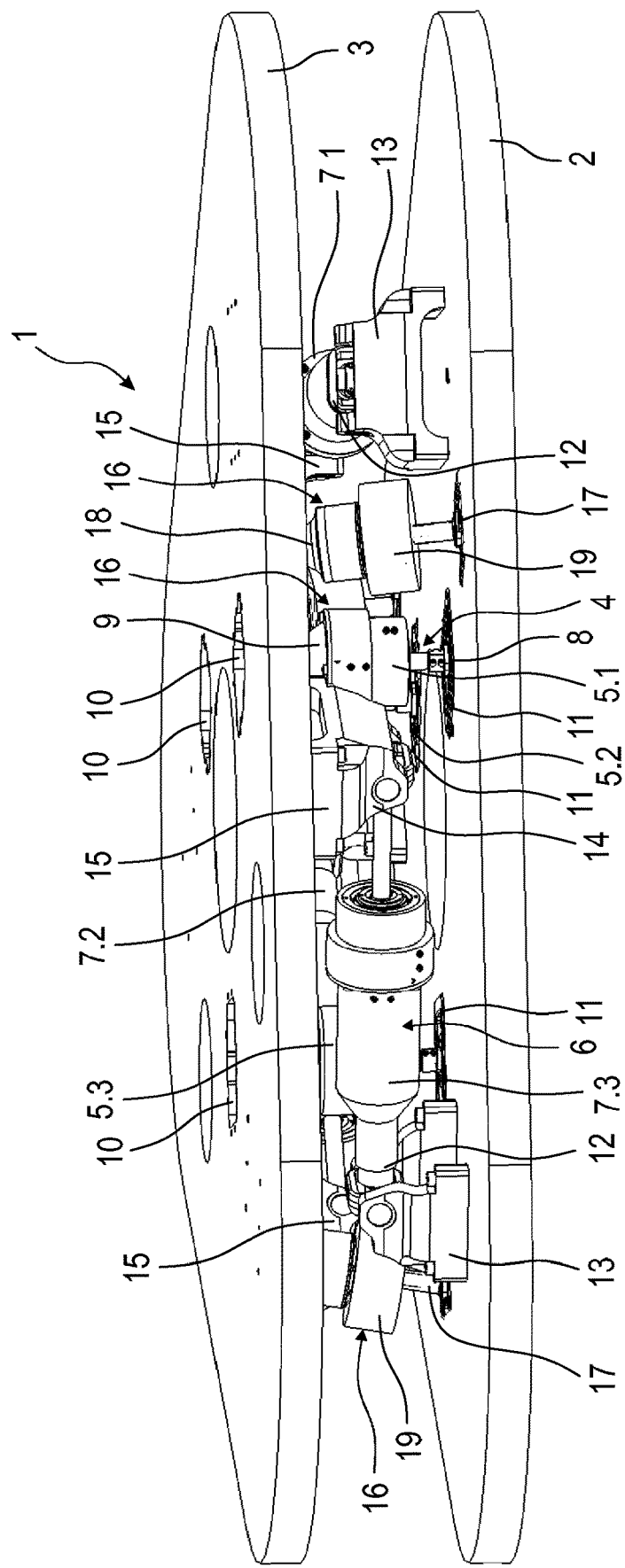

6-AXIS POSITIONING SYSTEM WITH LOCKING COMPONENT

CROSS REFERENCE TO RELATED APPLICATIONS

This application is a U.S. National Phase application under 35 U.S.C. 371 of International Application No. PCT/EP2021/056197, filed on Mar. 11, 2021, which claims priority to German Patent Application No. 10 2020 106 741.0, filed on Mar. 12, 2020. The entire disclosures of the above applications are expressly incorporated by reference herein.

BACKGROUND

Technical Field

The present invention relates to a 6-axis positioning system, comprising a base, a movable unit and six variable-length actuators, one end of each actuator being connected to the base and the other end of each actuator being connected to the movable unit. At least one additional variable-length component is provided, one end of which is connected to the base and the other end of which is connected to the movable unit. The additional component is designed such that the 6-axis positioning system can be releasably locked at least in certain positions of the movable unit by means of the additional component.

Related Art 6-axis positioning systems are also called hexapods and offer six degrees of freedom of movement in a compact space. The movable unit usually consists of a platform (movable unit) connected to the upper end of the actuators, on which elements or attachments to be positioned are arranged. 6-axis positioning systems are available in different sizes and for a wide range of applications. As components in the industrial production processes, hexapods can position high loads with submicrometer accuracy. For industrial applications, there are combinations of absolute measuring position sensors, suitable software and motion controllers that allow even complex motion profiles to be conveniently executed. A preferred drive for the actuators are brushless DC motors with brakes. The working space of such a 6-axis positioning system depends very much on the length of deployment ("telescoping") of the actuators. It is in particular in case of heavy-load 6-axis positioning systems that very large actuators are used to provide the necessary rigidity. Along with this comes increased installation space and increased costs.

A generic positioning system is known from DE 10 2004 004 313 A1. Therein, among other things, there is described an arrangement having six telescopically length-adjustable rod elements and three additional rod-shaped stiffening elements. All elements extend from a base element to a working element. It is further explained that the stiffening or reinforcing is to be achieved mainly in the working position, while the stiffening or reinforcing effect is reduced in the transition positions between the initial position and the working position. The detailed way the reinforcing is made is not described in detail. However, it is generally asserted that the stiffening elements can be adjusted in their length in a controllable or regulatable manner. It can be actuated hydraulically, pneumatically, mechanically or electrically. Alternatively, or in addition to stiffening elements, prestressing elements are also mentioned.

DE 10 2006 011 823 A1 deals with a positioning device with a base plate and a tool plate, which are connected to each other by means of six struts. The struts are combined into strut pairs, whereas a strut pair can have a common linkage, a common drive and also a common braking mechanism at least at the base plate.

DE 102 55 950 A1 deals with a robot drive that has two partial drives specialized for the respective task. This is a partial drive for force generation and a partial drive for positioning generation. In the specific case (see FIGS. 1 and 2), a robot arm is provided with a power drive consisting of an electric motor with gearbox and an open toothed belt. The toothed belt is pretensioned by tensile springs. In addition, a positioning drive is provided, consisting of a conventional DC micromotor with an angle encoder and a high-reduction gear. A coupling provides the appropriate coupling between the two partial drives. A locking brake, e.g. piezoelectrically actuated brake, is also addressed, which is assigned to the positioning drive.

CN 107538231 A1 relates to a multi-axis positioning device comprising a lower platform, an upper platform, six obliquely arranged actuators and three support columns arranged in the center. The load is mainly taken up by the support columns. The support columns comprise a linear guide at the upper end of which is a hinge device connected to the upper platform. The linear bearing is supported on a base by means of a pressure spring. The base is located and fixed on the lower platform, while the upper part of the support column is free to move relative to the lower platform. The six actuators provide precise control.

The problem of the present invention is therefore to provide a 6-axis positioning system of the type specified hereinbefore, which provides simplified locking, in particular in the target position, with a high degree of precision, even with increased loads.

SUMMARY

In a generic 6-axis positioning system, the additional component has a releasable locking brake, and the additional component is designed to be passively variable in length by means of the movement of the six driven actuators. The additional component is designed such that the 6-axis positioning system can be releasably locked at least in certain positions of the movable unit by means of the additional component. What is understood by the additional variable-length component is an element, assembly, etc., in addition to the six actuators. Accordingly, the at least one additional variable-length component is something that must be present on 6-axis positioning systems supplementary (in addition) to any locking devices or brakes that may possibly be present on the six actuators. An additional component also offers the advantage that it can be placed at a different location than the actuators, so that due to the grouping, distance from the center, etc. of the at least one additional component, significant impact can be made on the stiffening of the overall system caused by the locking. Such an arrangement is therefore also particularly suitable for heavy-load 6-axis positioning systems, since as a rule there have to be used large-sized heavy-load actuators. This leads, among other things, to the advantage that by means of additional simple measures, compliance with the target position can be achieved by more cost-effective means due to higher rigidity. The additional component does not actively participate in the positioning of the movable unit, but accordingly ensures locking in the predetermined target position by means of the locking brake. As a result, the additional components behave passively when the movable unit is moved, since they are pulled along or moved along by means of the actuators. The variable-length additional component therefore does not have its own drive, which affects the reduction of costs. Provision of a locking brake in purely passively configured, variable-length additional components also have the advantage that the precision of the entire 6-axis positioning system is greatly improved. Heat generation due to the locking brake(s) does not have a negative effect on the drive due to the six variable-length actuators, which makes the very high precision achievable. Consequently, the locking brakes can be largely thermally decoupled from the drives in the six actuators. Thermal expansions therefore have less influence on the positioning accuracy.

Advantageously, the additional component is designed such that the 6-axis positioning system can be releasably locked in the entire working space of the 6-axis positioning system. The at least one additional component is thus able to follow the movements of the movable unit in the working space and then lock it in the desired target position. Accordingly, the benefits are provided in the entire workspace.

According to one embodiment, the releasable locking brake is a piezo brake. This can be controlled very precisely so that the braking process itself does not affect the target position.

According to a further embodiment, the releasable locking brake may be a suction air brake (vacuum brake). Providing this is very inexpensive with a small amount of effort.

Particularly for reasons of symmetry, it is advantageous if, according to one embodiment, at least two, preferably three additional variable-length components are provided for locking the 6-axis positioning system. The variant in which one additional component is assigned to each of the two actuators is particularly advantageous. Uniform distribution also makes it possible to achieve uniform stiffening in the respective working space.

Accordingly, the additional component can be designed to increase the rigidity and natural frequency of the 6-axis positioning system in the locked state. In particular, with heavy-load 6-axis positioning systems, this is of particular advantage since even high loads can be arranged with very high positional accuracy using a more favorable 6-axis positioning system.

Particularly in heavy-load 6-axis positioning systems, very high forces generally act in the vertical direction. It is therefore advantageous if the additional component is so length-variable and pivotably connected to the base and the movable unit that the additional component is moveably arranged in an angular range of maximum of ±45°, preferably maximum of ±30°, with respect to a vertical or a perpendicular to a plane spanned by the base. In a basic position, the base and also the movable unit are generally arranged horizontally, respectively, so that the angular reference to a vertical line results. In principle, however, 6-axis positioning systems can assume different angular positions per se, i.e., for example, the base can be tilted out of the horizontal, which is why a reference to a vertical is then advantageous. A plane spanned by the base is given, for example, by a plane containing the centers of the joints of the additional components or the joints of the actuators. Additional components arranged in this way have a stiffening effect, particularly with regard to a primarily vertically introduced force.

In another advantageous embodiment, it is provided that the six actuators are divided into two groups, and that the actuators of the first group are arranged on the base within a region bounded by the actuators of the second group and on the movable unit. Preferably, the actuators of different groups are also configured differently. As a result, the movable unit with extended working space can be moved around the ends of the actuators of the first group attached to the movable unit. In this way, it is possible to configure these three actuators of the first group to be shorter than the three actuators of the second group and, if necessary, to provide them with more lifting force. A kind of division of work between the actuators of the first group and the second group is thus possible, resulting overall in a more compact, in particular flatter, design with extended working space. In addition, the additional components support the stiffening when the desired target position is assumed.

Conveniently, the at least one additional component may be located on the base and on the movable unit further out relative to the first group of actuators, preferably in the region between the actuators of the first group and the actuators of the second group. Through this, in particular, tilting forces that are initiated outside the range supported by the three actuators of the first group are additionally supported by the at least one component. Despite the greater pivoting capability achieved due to the arrangement of the actuators of the first group, stable positioning is still achieved.

In a further embodiment, it is provided that the actuators of the first group are so length-variably and pivotably connected to the base and the movable unit that each of the three actuators of the first group is movably arranged in an angular range of at maximum of ±30°, preferably a maximum of ±15°, with respect to a vertical or a perpendicular to a plane spanned by the base, and that the three actuators of the second group are so length-variably and pivotably connected to the base and the movable unit that each of the three actuators of the second group is movably arranged in an angular range of ≥0° to a maximum of 45°, preferably ≥0° to a maximum of 30°, with respect to a horizontal or parallel to a plane spanned by the base. This arrangement allows a main part of the load to be received by the three actuators of the first group, while the three actuators of the second group are primarily used for positioning. With a corresponding change in the length of the actuators, the ratios then shift, with the main lift load still being carried by the three actuators of the first group. The at least one additional component then stabilizes in the respective target position. The three actuators of the second group are generally arranged much more flatly than the three actuators of the first group due to the angle specification.

At its extreme, the three actuators of the second group can therefore be positioned flat or horizontally in the minimum stroke position and at an acute angle in the maximum stroke position. Overall, this results in a very flat and compact design. In such an arrangement, the three actuators of the second group require a higher positioning path. This is only possible if these three actuators are moved laterally past the three actuators of the first group. There may also be a passageway past the at least one additional component, or space may remain between the three actuators of the second group, for placement of the at least one additional component.

Preferably, the three actuators of the first group can be configured as heavy-load actuators, with a greater load capacity than the three actuators of the second group. Although standard and also identical parts can also be used, it is preferred if the three actuators of the first group and the three actuators of the second group are configured differently. There occurs the possibility that the three actuators of the first group are at least twice and further preferably at least three times as load strong as the actuators of the second group.

Further, the invention relates to a method of providing a 6-axis positioning system, comprising a base and a movable unit, and six variable-length actuators. One end of each actuator is connected to the base, and the other end of each actuator is connected to the movable unit, the method comprising the steps of moving the movable unit by an interaction of the six variable-length actuators relative to the base to a predetermined target position, and locking of the 6-axis positioning system in order to increase the rigidity and the natural frequency of the 6-axis positioning system in the target position by means of at least one additional component arranged in a variable length manner in addition to the actuators between the base and the movable unit.

Consequently, the six actuators do not themselves have to be configured in such a way that they provide the necessary rigidity and natural frequency of the system in the specified target position, but the actuators can be adapted accordingly with regard to the at least one additional component used, since an increase in the rigidity and natural frequency in the target position takes place by means of the at least one additional component. The more complexly configured actuators can therefore be less expensive or used in more unusual groupings without compromising on necessary rigidity and natural frequency in the target position in the working space.

Preferably, the additional component can be passively moved along with the movable unit as it moves by means of the interaction of the six variable-length actuators. Accordingly, dragging or telescoping is accomplished without significant resistance or support since the movement of the movable unit is reserved for the six variable-length actuators. Nevertheless, there is the additional possibility that the at least one movable unit provides damping. However, the main object of the movable unit is to lock it in the target position and increase the rigidity and natural frequency of the system.

BRIEF DESCRIPTION OF THE DRAWING

The FIG. 1s a perspective view of an embodiment of a 6-axis positioning system according to the invention.

DETAILED DESCRIPTION

Referring to the FIGURE, a first embodiment of a 6-axis positioning system 1 has a base 2 in the form of a triangular platform and a movable unit 3 also in the form of a triangular platform, as well as actuators arranged between them that are to be described in more detail. Each of the base 2 and the movable unit 3 is formed by a plate of substantially uniform thickness, preferably of a metal, such as steel. The actuators arranged between the base 2 and the movable unit 3 are grouped into a first group 4 comprising actuators 5.1, 5.2 and 5.3 and a second group 6 comprising actuators 7.1, 7.2 and 7.3. Actuators 5.1, 5.2 and 5.3 differ in function and configuration from actuators 7.1, 7.2 and 7.3, while the actuators of a respective group 4 or 6 have the same configuration. The actuators 5.1, 5.2 and 5.3 of the first group 4 are pivotally arranged with their lower ends 8 on the base 2 and with their upper ends 9 on the movable unit 3. The pivotable arrangement is, for example, in the form of a universal joint (cardan joint), so that pivoting movements about two axes are possible. For a more compact arrangement, the base 2 has a window recess 10 for mounting the lower end 8 of each of the actuators 5.1, 5.2, and 5.3 so that an axis of the universal joint is mounted within the window recess 10. Similarly, the movable unit 3 is provided with three window recesses 11 for the pivotable arrangement of the upper ends 9 of the actuators 5.1, 5.2 and 5.3. Again, an axle of the corresponding universal joint is fixed in the window recess 11.

A lower end of the actuators 7.1, 7.2 and 7.3 is pivotally arranged on a respective bearing block 13 arranged on the base 2. For the pivotable arrangement, a universal joint is again preferably used for pivoting about two axes. In a similar way, an upper end 14 of the actuators 7.1, 7.2 and 7.3 is arranged by means of a bearing block 15 attached to the movable unit 3. Also at the upper end 14, the pivotable arrangement is preferably by means of a universal joint for pivoting about two axes.

Due to the selected arrangement, the actuators 5.1, 5.2 and 5.3 of the first group 4 are arranged more upright than the actuators 7.1, 7.2 and 7.3 of the second group 6. Also helpful for such an arrangement are the window recesses 10 and 11 and the two bearing blocks 13 and 15. Each of the window recesses 10 and 11 is located further inwardly of the base 2 or movable unit 3 compared to the corresponding bearing blocks 13 or 15, respectively. Through this, the actuators 5.1, 5.2, 5.3 of the first group 4 are arranged within an area bounded by the actuators 7.1, 7.2, 7.3 of the second group 6 on the base 2 or the movable unit 3. Since the load is applied from above via the movable unit 3, it is also possible that the main load is taken up by the actuators 5.1, 5.2, 5.3. These are therefore configured as heavy-duty actuators, which have a much higher load capacity than the three actuators 7.1, 7.2, 7.3 of the second group 6. All 6 actuators are adjustable in length (telescopic) and are driven by a brushless DC motor. The basic operation and control of 6-axis positioning systems are known as such and will therefore not be discussed herein in more detail. In any case, the movable unit 3 can be both raised, lowered or shifted relative to the base 2 and tilted about all three spatial axes. The adjustability of the actuators 5.1, 5.2, 5.3 and 7.1, 7.2 and 7.3 as well as the arrangement determines the possible working space. Owing to the drive technology used, there is possible very precise control and positioning, even in the present area of heavy loads.

Supplementary to actuators 5.1, 5.2, 5.3 and 7.1, 7.2, 7.3, provision is made for three additional variable-length components 16 in the form of telescopic units. Like the actuators 5.1, 5.2, 5.3 and 7.1, 7.2 and 7.3, the components 16 are arranged evenly or symmetrically on both the base 2 and the movable unit 3. The lower end 17 of the components 16 is pivotally mounted to the base 2, and the upper end 18 is pivotally mounted to the movable unit 3. This occurs in a similar way to the actuators 5.1, 5.2, 5.3 of the first group 4, e.g. in the manner of a universal joint (cardan joint), so that the pivoting movements about two axes are possible. The additional components 16 are provided with a locking brake 19 (e.g. a piezo brake or a vacuum brake) by means of which they can be locked or unlocked at any time. Otherwise, when the locking brake 19 is open, the additional components 16 are free to change length without significant resistance, the change in length being passive due to actuation by the actuators 5.1, 5.2, 5.3 and 7.1, 7.2, 7.3.

In the basic position of the 6-axis positioning system 1 shown in the FIGURE, in which the base 2 and the movable unit 3 are aligned parallel to each other, i.e. the actuators 5.1, 5.2 and 5.3 of the first group 4 have the same length and the actuators 7.1, 7.2 and 7.3 of the second group 6 have the same length. Furthermore, actuators 5.1, 5.2 and 5.3 are in their fully retracted position, which is why actuators 7.1, 7.2 and 7.3 also assume their pivoted position as far down as possible. In this basic position, the actuators 5.1, 5.2 and 5.3 are aligned exactly vertically with their main axes, i.e. they are perpendicular to a plane spanned by the base 2. In this position, the actuators 7.1, 7.2 and 7.3 have an angle of approximately 0° to the horizontal or a plane parallel to a plane spanned by the base 2.

Components 16 are tilted slightly out of the vertical in this position and are arranged with their upper ends 18 closer to the upper ends 9 of each of the next actuators 5.1, 5.2, 5.3 of the first group 4 than the lower ends 17 are to the lower ends 8 of each of the next actuators 5.1, 5.2 and 5.3 of the first group 4. The angle of inclination to the vertical is approx. 10°. Moreover, the additional components 16 are placed further outside both the base 2 and the movable unit 3 in regard to the actuators 5.1, 5.2 and 5.3 of the first group 4. However, each of these actuators 5.1, 5.2, 5.3 is assigned an adjacent partner (component 16). The placement is approximately in the space between two actuators 7.1, 7.2, 7.3 of the second group 6. If the axes of the actuators 7.1, 7.2 and 7.3 of the second group 6 are extended so that they create a triangle, the actuators 5.1, 5.2, 5.3 of the first group 4 and also the additional components 16 are arranged within this triangle. This results in a compact grouping, i.e. one which, among other things, ensures that a relatively large pivoting can take place even with a small stroke of actuators 5.1, 5.2 and 5.3. Nevertheless, exact positioning is possible in the interaction of actuators 5.1, 5.2 and 5.3 as well as 7.1, 7.2 and 7.3.

In the fully retracted position of actuators 5.1, 5.2 and 5.3 shown in the FIGURE, actuators 7.1, 7.2 and 7.3 of the second group 6 are considerably longer than actuators 5.1, 5.2 and 5.3 of the first group 4. Accordingly, the maximum adjustment path of an actuator 7.1, 7.2 and 7.3 of the second group 6 is substantially larger than the maximum adjustment path of an actuator 5.1, 5.2 and 5.3 of the first group 4.

The additional components 16 are configured in such a way that, when the movable unit 3 assumes a controlled target position, these components activate the locking brake 19 by means of the actuators 5.1, 5.2, 5.3 of the first group 4 and 7.1, 7.2 and 7.3 of the second group 6 and thus stiffen the entire 6-axis positioning system 1 in a locking manner. This increases the overall rigidity of the system 1 and its natural frequency, so that very accurate and stiff positioning can be performed even in heavy-load operation.

In the following, the mode of action and operation of the embodiment shown is explained in more detail.

Targeted control of the drives of actuators 5.1, 5.2 and 5.3 as well as 7.1, 7.2 and 7.3 results in targeted positioning of the movable unit 3 relative to the base 2. A desired 6-axis positioning within a given working space is possible. The main load is carried by actuators 5.1, 5.2 and 5.3 of the first group 4 during lifting and lowering. These are therefore configured as corresponding heavy-load actuators so that considerable loads can be moved. The actuators 5.1, 5.2 and 5.3 of the first group 4 pivot only by a limited angular range with respect to a vertical or a perpendicular to a plane spanned by the base 2 (maximum of +30°, preferably maximum of +15°). Actuators 7.1, 7.2 and 7.3 are also adapted to pivot only by a limited angular range (from ≥0° to a maximum of 45°) to a horizontal or parallel line P to a plane spanned by base 2.

For example, by shortening or telescoping the actuators 7.1, 7.2 and 7.3 of the second group 6 and correspondingly pivoting and lengthening the actuators 5.1, 5.2 and 5.3 of the first group 4, the movable unit 3 can be rotated relative to the base 2, even without necessarily changing the distance. Overall, the required path of actuators 7.1, 7.2 and 7.3 is greater than that of actuators 5.1, 5.2 and 5.3.

The variable-length additional components 16 are passively moved during these positioning operations. This takes place by moving together or telescoping, depending on the direction of movement. As soon as the desired target position has been assumed by means of the actuators 5.1, 5.2, 5.3 of the first group 4 and 7.1, 7.2, 7.3 of the second group 6, the locking brake 19 is set and the 6-axis positioning system 1 is locked in the target position. The components 16 are configured to significantly increase the rigidity and natural frequency of the 6-axis positioning system 1 in the target position. This is particularly necessary since, in the embodiment shown, the actuators 5.1, 5.2 and 5.3 of the first group 4 are more central and therefore movements of the movable unit 3 may take place less stiffly. Components 16 provide appropriate compensation here, so that even heavy-load systems can be operated with great precision and control of their target position. As soon as a further movement is to take place, the locking brake 19 is released again and the components 16 are passively moved along. Any heat generated in the area of the locking brake 19 does not directly affect the drives of actuators 5.1, 5.2, 5.3 of the first group and actuators 7.1, 7.2, 7.3 of the second group. In this way precision gets improved.

All in all, the result is a 6-axis positioning system 1 that is compact, especially flat, and can bear high loads with the necessary rigidity. This is achieved by the appropriate grouping and functional dividing of the two actuator groups 4, 6 and the aid of the lockable components 16. It should also be noted that, for reasons of clarity, the presentation of the electrical connections and any other connections, as well as the presentation of the sensor system, has been omitted in the figure. The 6-axis positioning system 1 shown herein is controlled and regulated in accordance with the best-known procedures for known systems of this type (hexapods).

The invention claimed is:

1. A 6-axis positioning system comprising:
   a base;
   a movable unit; and
   six variable-length actuators, one end of each actuator being connected to the base and the other end of each actuator being connected to the movable unit,
   wherein at least one additional variable-length component is provided, one end of which is connected to the base and the other end of which is connected to the movable unit,
   wherein the additional variable-length component is configured to be passively moved by the movement of the six driven actuators, and
   wherein the additional variable-length component has a releasable locking brake and the additional variable-length component is configured to cause the releasable locking brake to releasably lock the 6-axis positioning system at least in certain positions of the movable unit, and
   wherein the six actuators are divided into two groups, and that the actuators of a first group are arranged on the base and on the movable unit within a region bounded by the actuators of a second group so that the second group of length-variable actuators are arranged further out radially from a center relative to the first group of length-variable actuators, and that the at least one additional variable-length component is arranged on the base and on the movable unit further out radially from the center relative to the first group of actuators.

2. The 6-axis positioning system of claim 1, wherein the additional variable-length component is configured to cause the 6-axis positioning system to be releasably locked in an entire working space of the 6-axis positioning system.

3. The 6-axis positioning system of claim 1, wherein the releasable locking brake is a piezo brake.

4. The 6-axis positioning system of claim 1, wherein the releasable locking brake is a suction air brake.

5. The 6-axis positioning system according to claim 1, wherein the at least one additional variable-length component is at least two additional variable-length components that are provided for locking the 6-axis positioning system.

6. The 6-axis positioning system of claim 5, wherein the at least two additional variable-length components increase a rigidity and a natural frequency of the 6-axis positioning system in the locked state.

7. The 6-axis positioning system according to claim 1, wherein the additional variable-length component is length-variable and pivotably connected to the base and the movable unit such that the additional variable-length component is moveably arranged in an angular range of maximum ±45° with respect to a vertical or a perpendicular to a plane spanned by the base.

8. The 6-axis positioning system of claim 1, wherein the three actuators of the first group are length-variably and pivotably connected to the base and the movable unit such that each of the three actuators of the first group is movably arranged in an angular range of maximum of ±30° with respect to a vertical or a perpendicular to a plane spanned by the base, and the three actuators of the second group are length-variably and pivotably connected to the base and the movable unit such that each of the three actuators of the second group is movably arranged in an angular range of ≥0° to a maximum of 45° with respect to a horizontal or parallel to a plane spanned by the base.

9. The 6-axis positioning system according to claim 1, wherein the three actuators of the first group are configured as heavy-load actuators, which have a higher load capacity than the three actuators of the second group.

* * * * *